(12) United States Patent
Jang et al.

(10) Patent No.: US 12,173,856 B2
(45) Date of Patent: Dec. 24, 2024

(54) LIGHTING DEVICE

(71) Applicant: LG INNOTEK CO., LTD., Seoul (KR)

(72) Inventors: Kee Youn Jang, Seoul (KR); Dong Il Eom, Seoul (KR); Jae Hyuk Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/286,454

(22) PCT Filed: Apr. 27, 2022

(86) PCT No.: PCT/KR2022/006023
§ 371 (c)(1),
(2) Date: Oct. 11, 2023

(87) PCT Pub. No.: WO2022/231302
PCT Pub. Date: Nov. 3, 2022

(65) Prior Publication Data
US 2024/0200734 A1 Jun. 20, 2024

(30) Foreign Application Priority Data

Apr. 28, 2021 (KR) .................. 10-2021-0055195

(51) Int. Cl.
*F21K 9/64* (2016.01)
*F21S 41/20* (2018.01)
(Continued)

(52) U.S. Cl.
CPC ................ *F21K 9/64* (2016.08); *F21S 41/24* (2018.01); *F21S 41/285* (2018.01); *F21V 7/05* (2013.01); *F21V 9/45* (2018.02)

(58) Field of Classification Search
CPC ............. F21V 9/30; F21V 9/32; G02B 6/006; G02B 6/0061; F21K 9/64
See application file for complete search history.

(56) References Cited

U.S. PATENT DOCUMENTS 6,286,970 B1 * 9/2001 Egawa ................. G02B 6/0028
362/558
9,964,262 B2 5/2018 Uno
(Continued)

FOREIGN PATENT DOCUMENTS

JP 2009-295501 12/2009
JP 2011-124063 6/2011
(Continued)

OTHER PUBLICATIONS

International Search Report dated Aug. 26, 2022 issued in Application No. PCT/KR2022/006023.
Japanese Office Action dated Oct. 29, 2024 issued in Application No. 2023-565973.

*Primary Examiner* — Joseph L Williams
(74) *Attorney, Agent, or Firm* — KED & ASSOCIATES, LLP

(57) ABSTRACT

The lighting device disclosed at an embodiment of the invention comprises: a reflective member; a resin layer disposed on the reflective member; a light emitting device disposed to correspond to one side surface of the resin layer; and a light wavelength conversion layer disposed on one surface of the resin layer. The light wavelength conversion layer includes a main phosphor pattern disposed in a long axis direction of the resin layer, the main phosphor pattern includes a first unit-phosphor pattern disposed in a first region and a second unit-phosphor pattern disposed in a second region, the first region may be located closer to the light emitting device than the second region, and a width of the first unit-phosphor pattern may be less than a width of the second unit-phosphor pattern.

20 Claims, 11 Drawing Sheets

(51) Int. Cl.
*F21S 41/24* (2018.01)
*F21V 7/05* (2006.01)
*F21V 9/45* (2018.01)

(56) References Cited

U.S. PATENT DOCUMENTS

| | | | | |
|---|---|---|---|---|
| RE48,492 E | * | 3/2021 | Vasylyev | G02B 6/0036 |
| 10,982,135 B2 | | 4/2021 | Oba et al. | |
| 2004/0130912 A1 | * | 7/2004 | Miyashita | G02B 6/0036 |
| | | | | 362/23.15 |
| 2009/0034230 A1 | * | 2/2009 | Lim | G02B 6/0061 |
| | | | | 362/84 |
| 2009/0034292 A1 | * | 2/2009 | Pokrovskiy | G02B 6/0028 |
| | | | | 362/617 |
| 2011/0019436 A1 | * | 1/2011 | Van Den Berge | G02B 6/0043 |
| | | | | 362/613 |
| 2014/0355293 A1 | | 12/2014 | Lee et al. | |
| 2014/0376254 A1 | | 12/2014 | Arimoto et al. | |
| 2017/0003439 A1 | * | 1/2017 | Lee | G02B 6/0061 |
| 2018/0045384 A1 | | 2/2018 | Uno | |
| 2018/0245763 A1 | | 8/2018 | Oshima et al. | |
| 2019/0194531 A1 | | 6/2019 | Oba et al. | |

FOREIGN PATENT DOCUMENTS

| | | |
|---|---|---|
| JP | 2012-142107 | 7/2012 |
| JP | 2012-253815 | 12/2012 |
| JP | 2018-098088 | 6/2018 |
| KR | 10-2013-0061307 | 6/2013 |
| KR | 10-2014-0127279 | 11/2014 |
| KR | 10-2020-0112611 | 10/2020 |
| KR | 10-2020-0126290 | 11/2020 |
| KR | 10-2021-0030679 | 3/2021 |
| WO | WO 2016/158371 | 10/2016 |
| WO | WO 2017/033820 | 3/2017 |
| WO | WO 2018/043616 | 3/2018 |
| WO | WO 2018-156547 | 8/2018 |

* cited by examiner (A)　　　　　　(B)　　　　　　(C)

(A)　　　　　　　　(B)

LIGHTING DEVICE

CROSS-REFERENCE TO RELATED PATENT APPLICATIONS

This application is a U.S. National Stage Application under 35 U.S.C. § 371 of PCT Application No. PCT/KR2022/006023, filed Apr. 27, 2022, which claims priority to Korean Patent Application No. 10-2021-0055195, filed Apr. 28, 2021, whose entire disclosures are hereby incorporated by reference.

TECHNICAL FIELD

An embodiment of the invention relates to a rail-type lighting device. An embodiment of the invention relates to a light unit, display device, or vehicle lamp having rail lighting device.

BACKGROUND ART

The light emitting diodes (LEDs) have advantages over conventional light sources such as fluorescent lamps and incandescent lamps, such as low power consumption, semi-permanent lifespan, fast response speed, safety, and environmental friendliness. Such light emitting diodes are applied to various lighting devices such as various display devices and indoor or outdoor lights. Recently, a lamp employing a light emitting diode has been proposed as a light source for vehicles. Compared with incandescent lamps, light emitting diodes are advantageous in that power consumption is small. In addition, since the size of the light emitting diode is small, the design freedom of the lamp may be increased, and the light emitting diode is economical due to its semi-permanent lifespan.

DISCLOSURE

Technical Problem

An embodiment of the invention may provide a lighting device that has a long shape in one direction. An embodiment of the invention may provide a lighting device having a light wavelength conversion layer at the bottom of a resin layer having a rail shape or a bar shape. An embodiment of the invention may provide a lighting device having a main phosphor pattern on a center region in a long axis direction and a sub-phosphor pattern on an edge region in the long axis direction at the bottom of the resin layer. An embodiment of the invention may provide a light unit with rail lighting, a display device, and a vehicle lamp.

Technical Solution

A lighting device according to embodiment of the invention comprises a reflective member; a resin layer disposed on the reflective member; a light emitting device disposed to correspond to one side surface of the resin layer; and a light wavelength conversion layer disposed on one surface of the resin layer, wherein the light wavelength conversion layer includes a main phosphor pattern disposed in a long axis direction of the resin layer, the main phosphor pattern includes a first unit-phosphor pattern disposed in a first region and a second unit-phosphor pattern disposed in a second region, the first region is disposed closer to the light emitting device than the second region, and a width of the first unit-phosphor pattern may be smaller than a width of the second unit-phosphor pattern.

According to an embodiment of the invention, the main phosphor pattern includes a third unit-phosphor pattern disposed on a third region adjacent to the second region, the second region is disposed between the first region and the third region, and, a width of the third unit-phosphor pattern may be greater than the width of the first unit-phosphor pattern. The first to third unit-phosphor patterns may have the same length.

According to an embodiment of the invention, the light wavelength conversion layer may be disposed in the first region and include a sub-phosphor pattern disposed to be spaced apart from the first unit-phosphor pattern. The sub-phosphor pattern may include a plurality of unit sub-phosphor patterns spaced apart from each other, and cross-sectional areas of the plurality of unit sub-phosphor patterns may be the same.

According to an embodiment of the invention, a separation distances between the plurality of unit sub-phosphor patterns may be the same. A phosphor concentration of the first unit-phosphor pattern may be the same as a phosphor concentration of the second unit-phosphor pattern.

According to an embodiment of the invention, a colored optical layer disposed on the resin layer include, wherein the colored optical layer emits light emitted from the light wavelength conversion layer and may limit an emission of light in the same wavelength range as a light emitted from the light emitting device.

A lighting device according to an embodiment of the invention includes a reflective member; a resin layer disposed on the reflective member; a light emitting device disposed to correspond to one side surface of the resin layer; and a light wavelength conversion layer disposed on one surface of the resin layer, wherein the light wavelength conversion layer includes a main phosphor pattern disposed in the long axis direction of the resin layer and a sub-phosphor pattern spaced apart from the main phosphor pattern, the main phosphor pattern includes a first unit-phosphor pattern disposed in a first region, and the sub-phosphor pattern may include a plurality of unit sub-phosphor patterns disposed in the first region and spaced apart from the first unit-phosphor pattern.

According to an embodiment of the invention, the light wavelength conversion layer may be disposed between the resin layer and the reflective member.

A lighting device according to an embodiment of the invention includes a resin layer; a light emitting device disposed to correspond to one side surface of the resin layer; a light wavelength conversion layer disposed on one surface of the resin layer; and a colored optical layer disposed on the resin layer, wherein the light wavelength conversion layer includes regions with different concentrations of phosphors, and the colored optical layer emits light passing through the phosphors and limit an emission of light in the same wavelength range as the light emitted from the light emitting device.

According to an embodiment of the invention, the light wavelength conversion layer may include a first region where the phosphor of a first concentration is disposed, a second region where a phosphor of a second concentration greater than the first concentration is disposed, and a third region where a phosphor of a third concentration greater than the second concentration is disposed. According to an embodiment of the invention, light emitted from the light emitting device, converted to wavelength in the first to third regions, and passing through the colored optical layer may have uniform distribution. According to an embodiment of the invention, the light emitting device emits blue light, the light of the light emitting device that passes through the light wavelength conversion layer emits light in a wavelength range of 615 nm to 650 nm, and the colored optical layer is formed in red.

Advantageous Effects

According to an embodiment of the invention, light distribution of rail lighting may be improved and wavelength conversion efficiency may be improved. According to an embodiment of the invention, it may be applied to various lamps by arranging flexible rail lighting device. The optical reliability of rail lighting device according to an embodiment of the invention may be improved, and rail-shaped lighting device may be applied as a pre-light emitting device to vehicle lamps, light units, and various display devices.

BEST MODE

Figure 1:
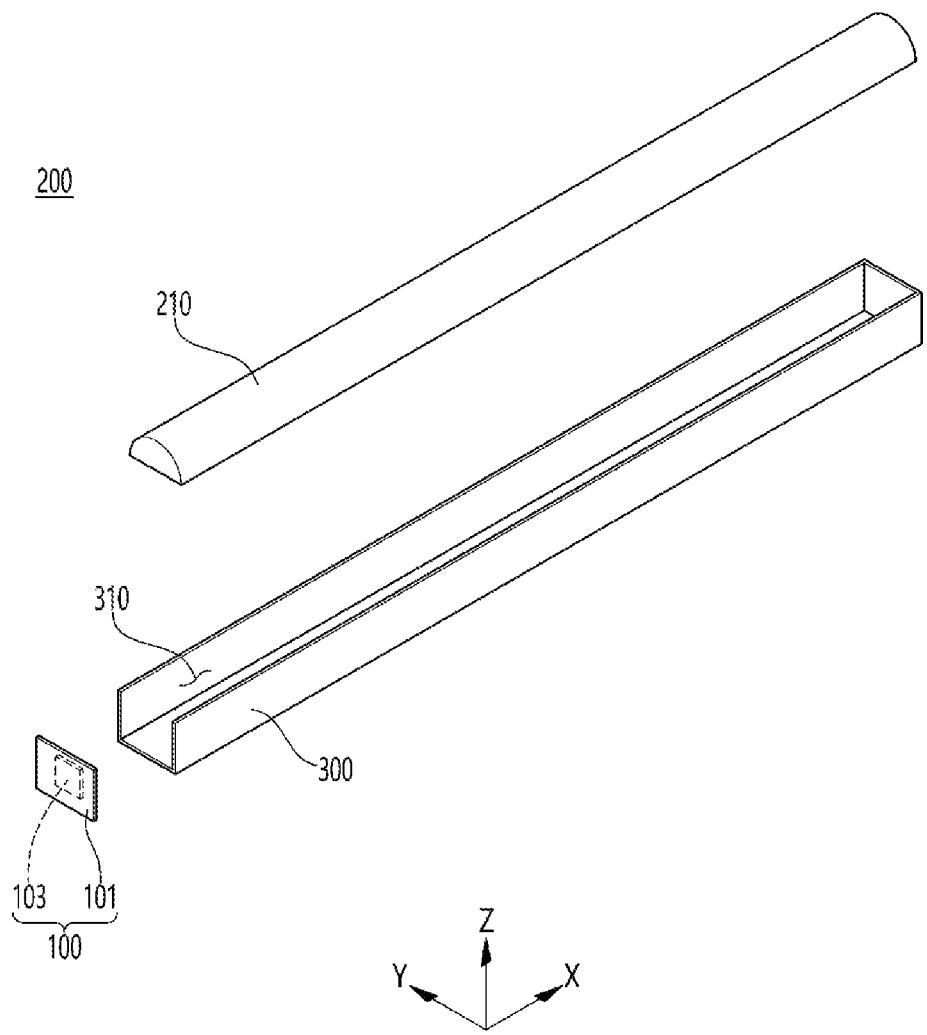
FIG. 1 is an example of an exploded perspective view showing a lighting device according to an embodiment of the invention.

Hereinafter, preferred embodiments of the invention will be described in detail with reference to the accompanying drawings. However, it should be understood that the embodiments described in this specification and the configurations shown in the drawings are only one preferred embodiment of the invention, and there may be various equivalents and modifications that may replace them at the time of this application. In describing the operating principle of the preferred embodiment of the invention in detail, if it is determined that a detailed description of a related known function or configuration may unnecessarily obscure the subject matter of the invention, the detailed description will be omitted. Terms to be described later are terms defined in consideration of functions in the invention, and the meaning of each term should be interpreted based on the contents throughout this specification. The same reference numerals are used throughout the drawings for parts having similar functions and actions. Since the embodiments and the configurations illustrated in the drawings are preferred embodiments of the present invention and do not represent all of the technical ideas of the present invention, there may be various equivalents and modifications that may replace them at the time of the present application. The same reference numerals are used for parts with similar functions and actions throughout the drawings. The lighting device according to the invention can be applied to various lamp devices that require lighting, such as vehicle lamps, lighting devices for mobile devices, household lighting devices, and industrial lighting devices. For example, when applied to vehicle lamps, head lamps, side lights, side mirror lights, fog lights, tail lamps, brake lights, auxiliary brake lights, turn signals, position lamps, daytime running lights, vehicle interior lights, door scarves scar, rear combination lamp, backup lamp, room lamp, instrument panel lighting, etc. The lighting device of the invention can be applied to indoor and outdoor advertising devices, display devices, mobile devices, and various electric train fields. In addition, it may be applied to all lighting-related fields or advertising-related fields that are currently developed and commercialized or that may be implemented according to future technological development. Hereinafter, embodiments will be clearly revealed through the accompanying drawings and description of the embodiments. In the description of the embodiments, when each layer (film), region, pattern, or structure is described as being formed on or under the substrate, each layer (film), region, pad, or pattern, "on" and "under" include both "directly" or "indirectly" through other layers. In addition, the criterion for the top or bottom of each layer will be described based on the drawings.

Embodiment

Figure 2:
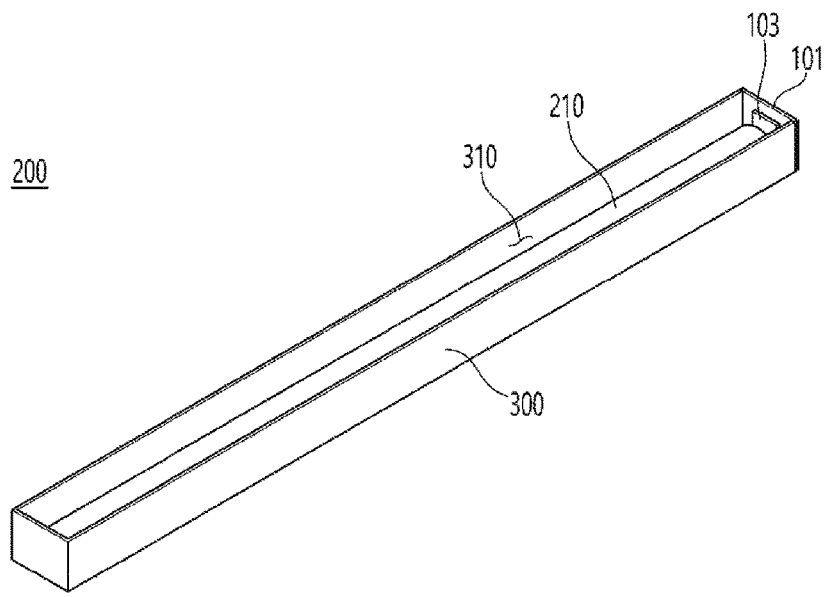
FIG. 2 is an example of a combined perspective view of FIG. 1.
Figure 3:
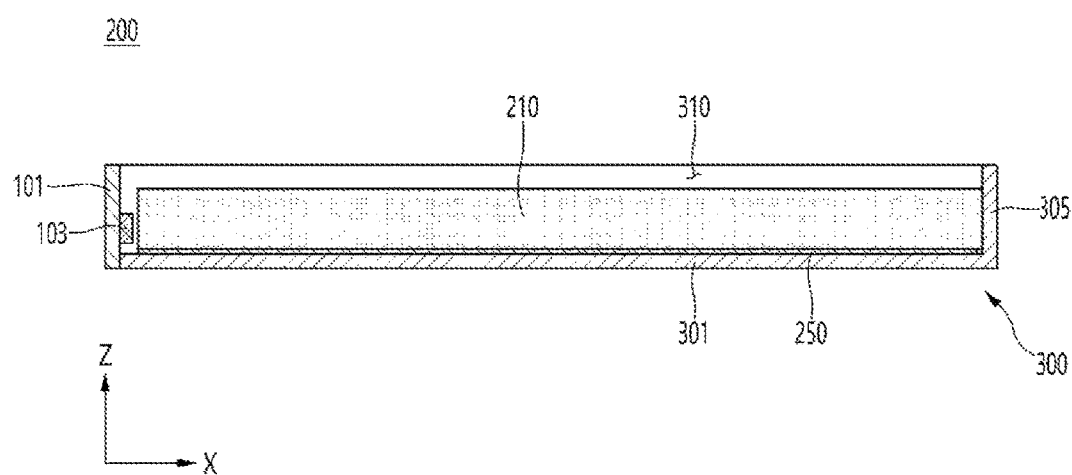
FIG. 3 is a cross-sectional view of the lighting device of FIG. 2 in the first direction along the long axis.
Figure 4:
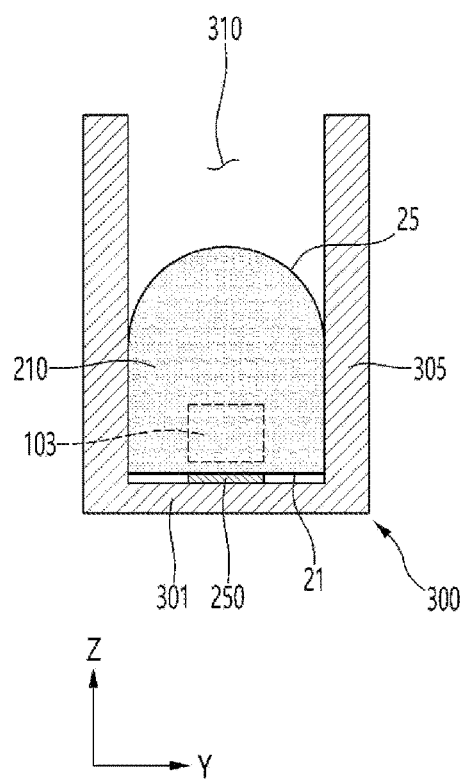
FIG. 4 is a cross-sectional view of the lighting device of FIG. 2 in the second direction along the short axis.
Figure 5:
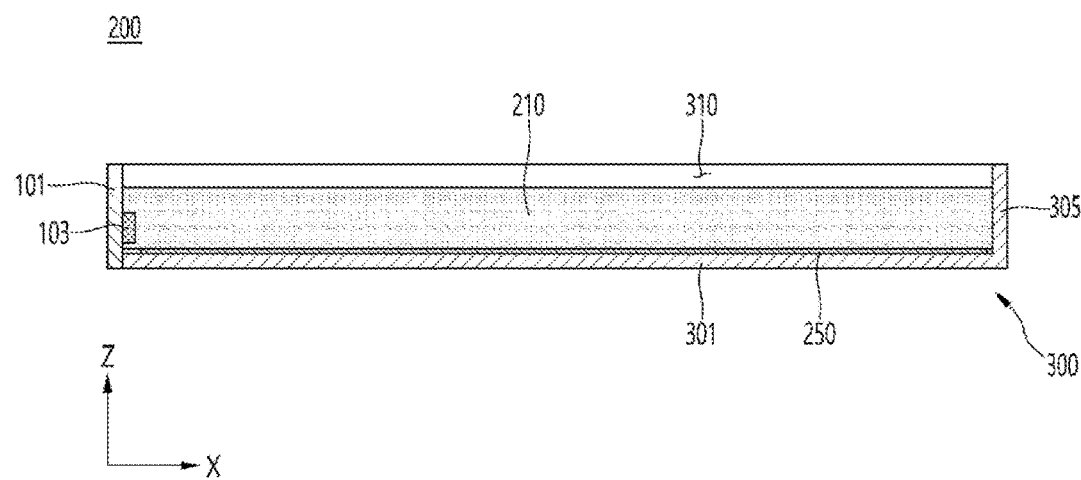
FIG. 5 is another example of the lighting device of FIG. 3.
Figure 6:
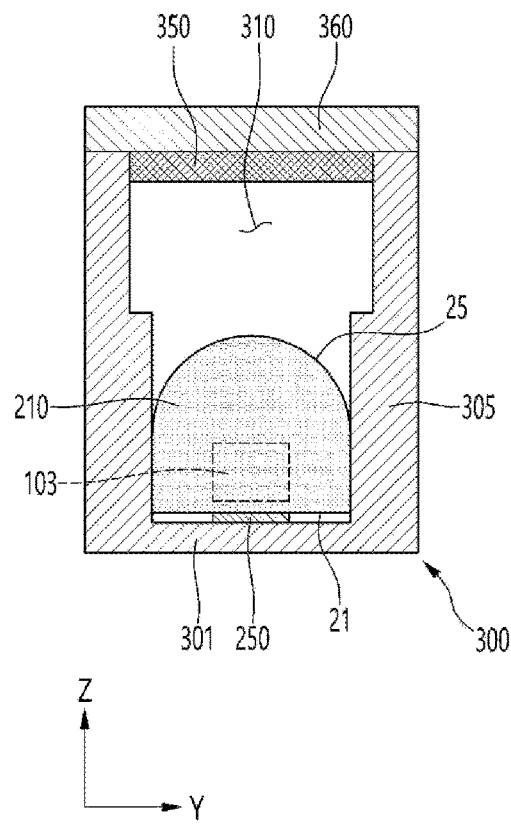
FIG. 6 is a diagram showing an example of the arrangement of the light emitting module in the lighting device of FIG. 2.
Figure 7:
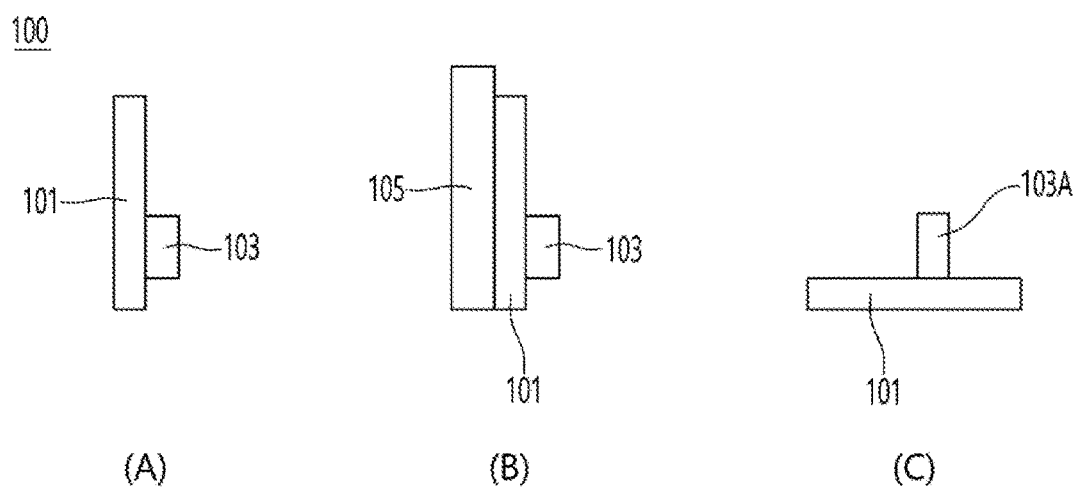
FIG. 7 (A) to (C) are another example of the lighting device of FIG. 4.
Figure 8:
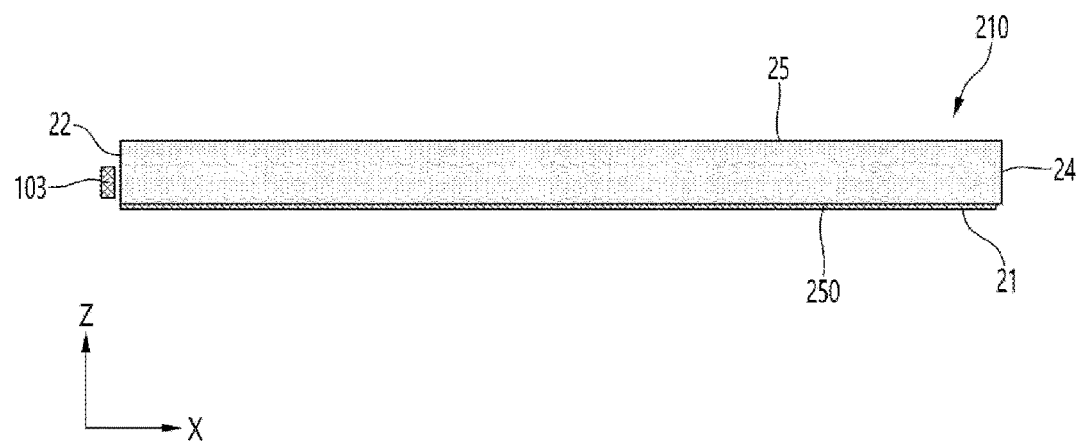
FIG. 8 is a diagram showing the arrangement of a light emitting device and a resin layer in a lighting device according to an embodiment of the invention.
Figure 9:
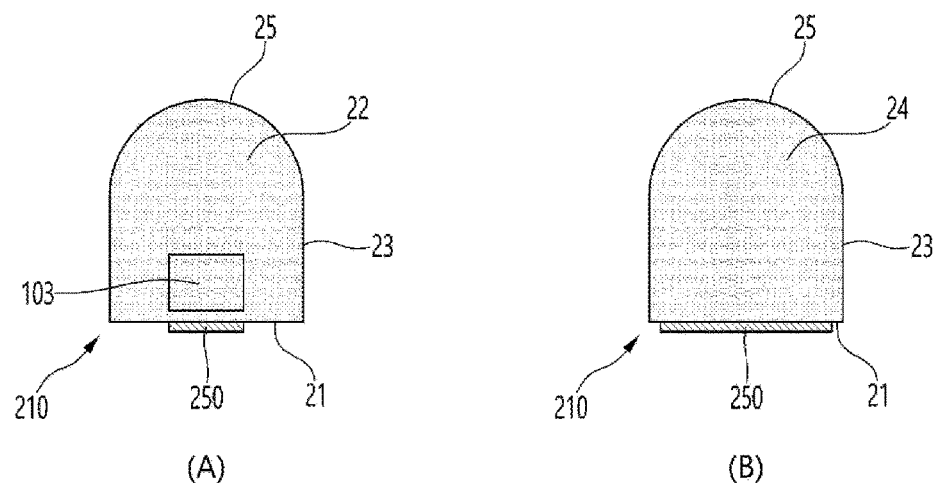
FIG. 9 (A) and (B) are views seen from the first surface on an incident side and the second surface on an opposite side of the resin layer of FIG. 8.
Figure 10:
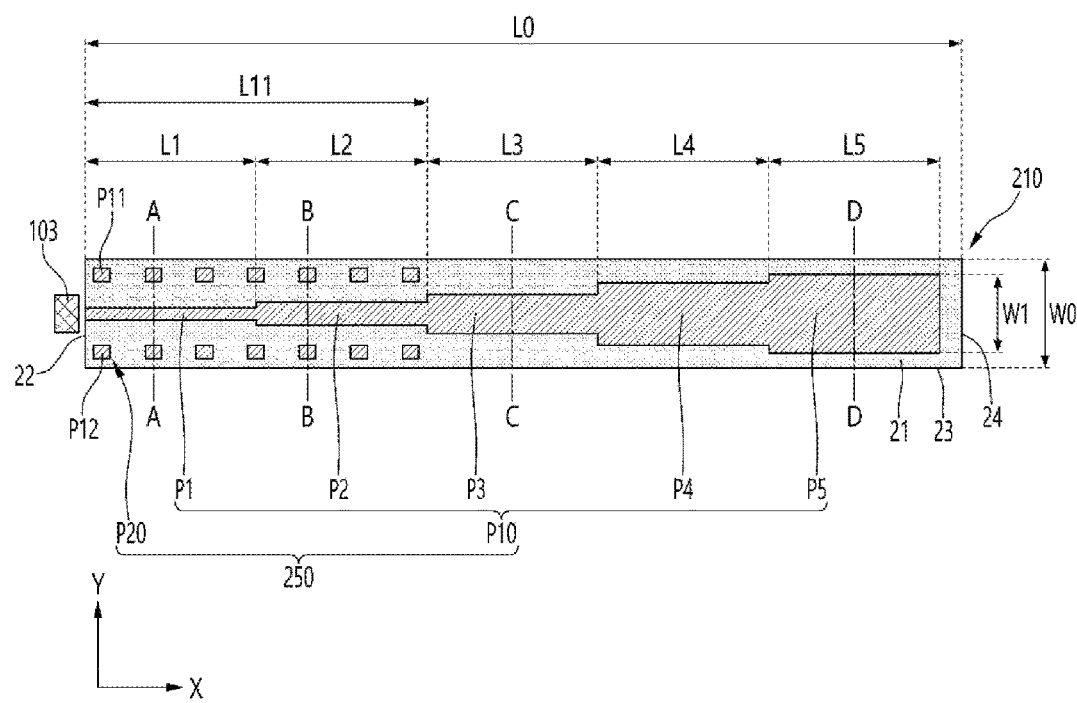
FIG. 10 is a diagram showing a pattern of a light wavelength conversion layer disposed on the bottom of the resin layer of FIG. 8.

FIG. 1 is an example of an exploded perspective view showing a lighting device according to an embodiment of the invention, FIG. 2 is an example of a combined perspective view of FIG. 1, FIG. 3 is a cross-sectional view of the lighting device of FIG. 2 in the first direction along the long axis, FIG. 4 is a cross-sectional view of the lighting device of FIG. 2 the second direction along the short axis, FIG. 5 is another example of the lighting device of FIG. 3, FIG. 6(A)(B)(C) is a diagram showing an example of the arrangement of the light emitting module in the lighting device of FIG. 2, FIG. 7 is another example of the lighting device of FIG. 4, FIG. 8 is a diagram showing the arrangement of a light emitting device and a resin layer in a lighting device according to an embodiment of the invention, FIG. 9(A)(B) is view seen from the first surface on an incident side and the second surface on an opposite side of the resin layer of FIG. 8, FIG. 10 is a diagram showing a pattern of a light wavelength conversion layer disposed on the bottom of the resin layer of FIG. 8, FIG. 11(A)-(D) is example of side cross-sectional views along lines A-A, B-B, C-C, and D-D of the resin layer of FIG. 10.

Referring to FIGS. 1 to 11, a lighting device 200 according to an embodiment of the invention may include a light emitting device 103, a resin layer 210, and a light wavelength conversion layer 250. The lighting device 200 may include a reflective member 300 in which the resin layer 210 is accommodated. The lighting device 200 may provide point light emitting devices generated from the light emitting device 103 as lane lighting or line lighting. The lighting device may include at least one of blue, green, red, yellow, or white, for example, white or red. When the lighting device 200 emits white light, it may be applied to a vehicle lamp with a red lens or used as indoor or outdoor lighting. When the lighting device 200 emits red light, it may visually indicate whether it is turned on or not. The lighting device 200 may be a flexible module or a rigid module. The lighting device 200 may be flat or curved in at least one of the first and second directions X and Y.

The light emitting device 103 may include a light emitting diode (LED), organic electroluminescence (EL), or organic LED (OLED). The light emitting device 103 may include an LED chip or a package packaging the LED chip with a molding member. The light emitting device 103 may emit light of at least one of blue, green, red, and white. The light emitting device 103 may emit blue light or a wavelength ranging from 400 nm to 500 nm. The package device may include a phosphor layer or molding member covering the surface of the LED chip. The phosphor layer may be a layer to which a phosphor is added, and the molding member may be a transparent resin with a phosphor or a transparent resin without impurities such as a phosphor. The light emitting device 103 is disposed on one side of the printed circuit board 101 and may be electrically connected to the printed circuit board 101. The light emitting device 103 may be provided as a single piece on the printed circuit board 101 or may be provided in three or less pieces.

The printed circuit board 101 may be arranged parallel to the incident-side first surface 22 of the resin layer 210 or perpendicular to the bottom 21 of the resin layer 210. The light emitting device 103 and the printed circuit board 101 may be defined as a light emitting module 100.

As shown in FIG. 7(A)(B), the light emitting device 103 of the light emitting module 100 may emit light on the entire surface or on five sides, and a heat sink 105 may be coupled to the other side of the printed circuit board 103. Or, as shown in FIG. 7(C), the printed circuit board 101 is disposed in a direction (i.e., horizontal direction) perpendicular to the incident-side surface of the resin layer 210, and the light emitting device 103A may be implemented as a package or LED chip that emits light from the upper surface of the printed circuit board 101 to one side (the surface opposite to the resin layer). The printed circuit board 101 may include, for example, a resin-based printed circuit board (PCB), a metal core PCB, a flexible PCB, a ceramic PCB, or an FR-4 board. The printed circuit board 101 may be made of a flexible or non-flexible material. The printed circuit board 101 may be made of an insulating or non-insulating material, or may be a thermally conductive or electrically conductive material. The printed circuit board 101 may have a circuit pattern disposed on the upper portion or/and a lower portion, and the circuit pattern may include a plurality of pads disposed in a region corresponding to the light emitting device 103. The circuit pattern on the printed circuit board 101 may be placed at the upper portion or at the upper portion and lower portion. A protective layer made of a reflective material may be disposed on the printed circuit board 101. The protective layer may be a solder resist material or an insulating material layer, or may be a photo solder resist (PSR) material. The protective layer may be a layer that protects the circuit pattern. The protective layer and the circuit pattern may be provided on the printed circuit board 101.

The light emitting device 103 may face the incident-side first surface 22 of the resin layer 210. The light emitting device 103 may be disposed at the center or below the center of the first surface 22 of the resin layer 210 for light incident efficiency. The printed circuit board 101 may face the first surface 22 on the incident side of the resin layer 210. The first surface 22 of the resin layer 210 may be spaced apart from the light emitting device 103 to improve the incident efficiency of light, and may be spaced apart from the light emitting device 103 by more than 50 μm, for example, in the range of 50 μm to 400 μm or 50 μm to 200 μm. As another example, as shown in FIG. 5, the light emitting device 103 may be embedded in one side surface of the resin layer 210. In this case, light loss between the resin layer 210 and the light emitting device 103 may be reduced.

The resin layer 210 may include a transparent resin material. The resin layer 210 may include a diffusion agent therein, but is not limited thereto. The refractive index of the resin layer 210 may be 1.70 or less, for example, in the range of 1.25 to 1.70.

The resin layer 210 may be provided in the form of a rail or line having a long length in one direction. The first direction X of the resin layer 210 may be the long axis direction, and the second direction Y may be the short axis direction, and the length of the first direction X may be more than 10 times greater than the width of the second direction Y, for example, in the range of 10 to 200 times. The resin layer 210 may include a bottom 21, a first surface 22 on the incident side, a second surface 24 on the opposite side of the first surface 22, a side surface 23, a side opposite to the bottom 21 or upper surface 25. The bottom 21, the side surfaces 23, and the upper surface 25 may be arranged to be long in the first direction X.

The bottom 21 of the resin layer 210 may be flat or some regions of the bottom 21 may have a concavo-convex pattern. The first surface 22 may be a vertical plane or an inclined surface. The second surface 24 may be provided as a vertical or inclined surface, or may be provided with a layer of reflective material. The side surface 23 of the resin layer 210 may be disposed between the bottom 21 and the upper surface 25 at both sides of the resin layer 210, and may be connected to the lower end of the curved surface of the upper surface 25. The side surface 23 may be part of the upper surface when the lower end of the upper surface 25 extends to the boundary with the bottom 21. The upper surface 25 may include a curved surface. The upper surface 25 may have a hemispherical side cross section. The upper surface 25 may be a surface from which light is emitted. The side surfaces 23 extend vertically from both edges of the bottom 21, and the upper surface 25 may be formed in a convex curved or hemispherical shape at the upper end of both sides 23. The both side surfaces 23 and the upper surface 25 may have a long length in one direction, that is, the same length as the resin layer 210.

The resin layer 210 may include at least one material selected from the group consisting silicone, silicone molding compound (SMC), epoxy, and epoxy molding compound (EMC). The resin layer 210 may include a UV (ultra violet) curable resin or a thermosetting resin material, and may optionally include, for example, PC, OPS, PMMA, PVC, etc. For example, the main material of the resin layer 210 may be a resin material mainly made of urethane acrylate oligomer. For example, a synthetic oligomer, urethane acrylate oligomer, mixed with a polyacrylic polymer type may be used. Of course, it may further include monomers mixed with low boiling point diluted reactive monomers such as isobornyl acrylate (IBOA), Hydroxylpropyl acrylate (HPA), and 2-hydroxyethyl acrylate (2-HEA), and as an additive, a photoinitiator (such as 1-hydroxy cyclohexyl phenyl-ketone, etc.) or antioxidants may be mixed.

As shown in FIGS. 8 and 9, the light wavelength conversion layer 250 may be disposed on at least one surface of the resin layer 210. The light wavelength conversion layer 250 may be adhered to the bottom 21 of the resin layer 210. The light wavelength conversion layer 250 may be attached to the bottom 21 of the resin layer 210 in the form of a pre-manufactured film, or may be formed on the bottom 21 by a printing method, but is not limited thereto.

At the bottom 21 of the resin layer 210, the light wavelength conversion layer 250 may be disposed from the first surface 22 to the second surface 24 adjacent to the light emitting device 103. The light wavelength conversion layer 250 may include red or yellow phosphors, or may include red and yellow phosphors. The light wavelength conversion layer 250 converts the wavelength of the incident first light to emit second light. Accordingly, the resin layer 210 may emit third light mixed with the first light and the second light. The first light includes at least one of blue, green, and red, the second light has a main wavelength in the range of 615 nm to 650 nm, or may be red or yellow light, and the third light may be red or white light.

Figure 11:
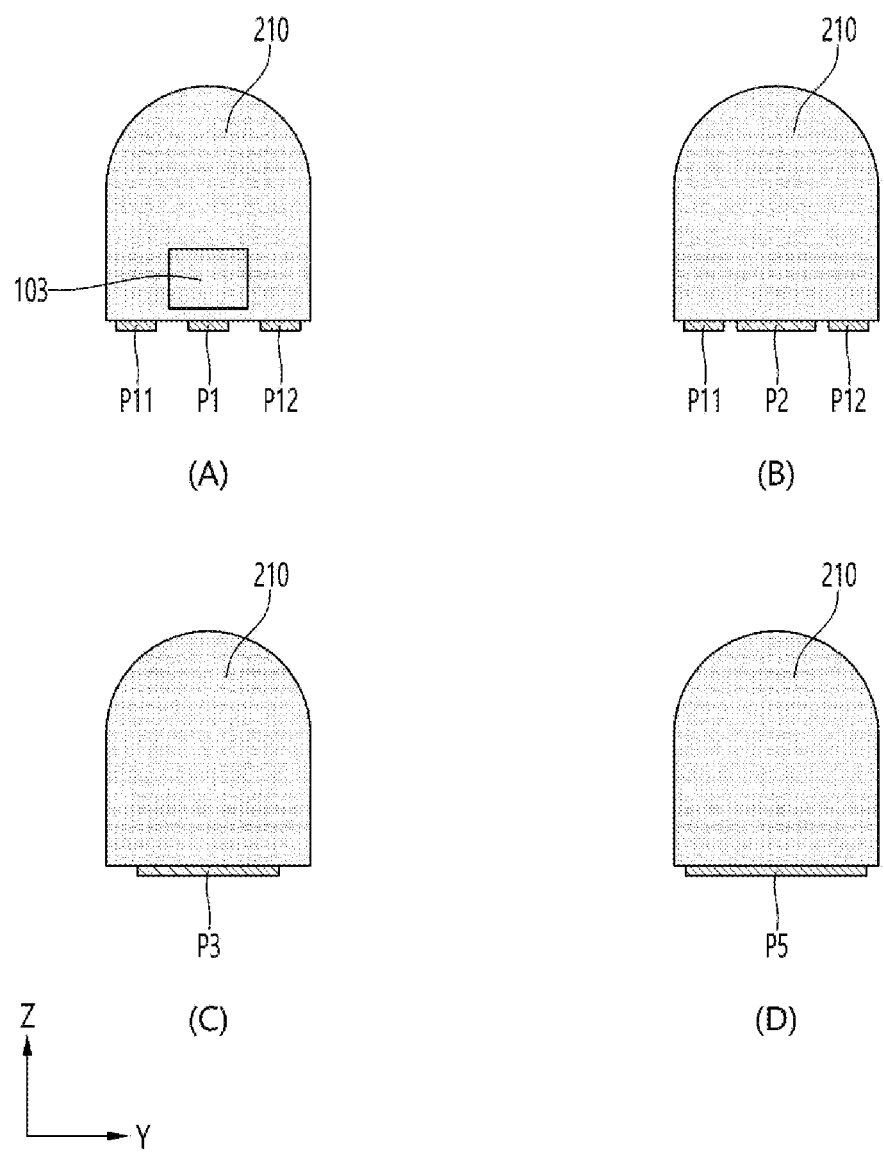
FIG. 11 (A) to (D) are examples of side cross-sectional views along lines A-A, B-B, C-C, and D-D of the resin layer of FIG. 10.

As shown in FIGS. 10 and 11, the light wavelength conversion layer 250 may be spaced apart from the first surface 22 and the second surface 24 on the bottom 21 of the resin layer 210. Here, when the light wavelength conversion layer 250 is exposed to the first surface 22 and the second surface 24, the adhesive strength at both ends of the light wavelength conversion layer 250 may decrease, so that the light wavelength conversion layer 250 may be spaced at least 1 mm from the lower ends of the first and second surfaces 22 and 24. When both side surfaces 23 of the bottom 21 of the resin layer 210 are exposed, the adhesive strength of the light wavelength conversion layer 250 may be reduced, so that the light wavelength conversion layer 250 may be spaced at least 1 mm from the lower ends of the side surfaces 23. The light wavelength conversion layer 250 has a width of a region adjacent to the first surface 22 in the width direction (or short axis direction) that is smaller than the width of the light emitting device 103, and has a width of a region adjacent to the second surface 23 that is 1.1 times or more, for example, in a range of 1.1 to 5 times or 1.1 to 3.5 times the width of the light emitting device 103. Accordingly, a uniform wavelength conversion distribution may be provided according to the difference in luminance of the light wavelength conversion layer 250. When it is outside the above range, the wavelength conversion efficiency on the incident side is low or the improvement in wavelength conversion efficiency may be minimal compared to the increase in the phosphor area in a region adjacent to the second surface 23.

The light wavelength conversion layer 250 may include a main phosphor pattern P10 disposed in the long axis direction X of the resin layer 210. The length of the main phosphor pattern P10 in the long axis direction X may be smaller than the length L0 of the resin layer 210 in the long axis direction. The maximum width W1 of the main phosphor pattern P10 may be smaller than the width W0 of the resin layer 210 in the long axis direction.

The length L0 of the resin layer 210 in the long axis direction may be 300 mm or more, for example, in the range of 300 mm to 600 mm or 300 mm to 450 mm. The width W0 of the resin layer 210 may be 5 mm or more, for example, in the range of 5 mm to 20 mm or 5 mm to 10 mm, and may be provided as rail lighting or line lighting having width of 10 mm or 20 mm or less. Here, when the resin layer 210 exceeds 600 mm, light emitting devices are disposed on the first and second surfaces 22 and 24 of the resin layer 210, respectively, and the following light wavelength conversion layers 250 may be arranged symmetrically with respect to the center of the bottom at the bottom of the resin layer 210.

The main phosphor pattern P10 may include unit-phosphor patterns P1, P2, P3, P4, and P5 arranged in each region divided into a plurality of regions in the long axis direction X. The unit-phosphor patterns P1, P2, P3, P4, and P5 may have different pattern widths in different regions. The different regions may be divided into three or more regions and may be arranged in the following order: a first region adjacent to the light emitting device, and second and third regions adjacent to the first region. For example, the width of the first unit-phosphor pattern P1 disposed in the first region adjacent to the first surface 22 of the resin layer 210 may be smaller than the width of the unit-phosphor patterns P2, P3, P4, and P5 disposed in another area adjacent to the second surface 24.

The unit-phosphor patterns P1, P2, P3, P4, and P5 may have gradually narrowed pattern widths in regions close to the first surface 22 from the bottom center of the resin layer 210, and may gradually increase as the region close the second surface 24. Among the unit-phosphor patterns, second, third, fourth, and fifth unit-phosphor patterns P2, P3, P4, and P5 may be arranged in second, third, fourth, and fifth regions, respectively, and the second region is disposed between the first region and the third region, and the fourth region may be disposed between the third region and the fifth region.

The width of the second unit-phosphor pattern P2 may be greater than the width of the first unit-phosphor pattern P1 and may be smaller than the width of the third unit-phosphor pattern P3. The width of the third unit-phosphor pattern P3 may be greater than the width of the first and second unit-phosphor patterns P1 and P2, and may be smaller than the width of the fourth unit-phosphor pattern P4. The width of the fourth unit-phosphor pattern P4 may be greater than the width of the first, second, and third unit-phosphor patterns P1, P2, and P3 and may be smaller than the width of the fifth unit-phosphor pattern P5. The width W1 of the fifth unit-phosphor pattern (P5), which is the last pattern, is larger than the width of the first, second, third, and fourth unit-phosphor patterns P1, P2, P3, and P4, and may be smaller than the bottom width W0 of the resin layer 210. The phosphor concentrations of the different unit-phosphor patterns P1, P2, P3, P4, and P5 may be the same. As another example, the first and second unit-phosphor patterns P1 and P2 have the same first phosphor concentration, or the third, fourth and fifth unit-phosphor patterns P3, P4, and P5 may have a second phosphor concentration higher than the first phosphor concentration.

Here, the lengths L1, L2, and L3 of the first to third unit-phosphor patterns P1, P2, and P3 in the first direction X are arranged to be equal to each other to provide a uniform wavelength conversion distribution in the incident side region. As another example, the lengths L1, L2, and L3 of the first to third unit-phosphor patterns P1, P2, and P3 in the first direction X satisfy in the relationship of length: L1<L2<L3, and a unit-phosphor pattern with a narrower pattern width is arranged at a smaller length, so that more incident light may proceed toward the second surface 22. As another example, the lengths L1, L2, and L3 of the first to third unit-phosphor patterns P1, P2, and P3 in the first direction X satisfy in the relationship of length: L1>L2>L3, and a unit-phosphor pattern with a narrower pattern width may be disposed at a longer length to reduce the hot spot problem caused by the amount of light on the incident side.

The light wavelength conversion layer 250 is disposed in the first region and may include a sub-phosphor pattern P20 disposed to be spaced apart from the first unit-phosphor pattern P1. The sub-phosphor pattern P20 may include a plurality of patterns arranged along both sides of the resin layer 210. The sub-phosphor pattern P20 may include the same phosphor as the phosphor added to the main phosphor pattern P10. As another example, the sub-phosphor pattern P20 may include a phosphor different from the phosphor added to the main phosphor pattern P10, in which case the main and sub-phosphor patterns P10 and P20 have the same area or may be arranged with an area difference of 20% or less.

The sub-phosphor pattern P20 includes a plurality of unit sub-phosphor patterns P11 and P12 spaced apart from each other, and the cross-sectional areas of the plurality of unit sub-phosphor patterns P11 and P12 may be the same. The plurality of unit sub-phosphor patterns P11 and P12 may be provided in the same shape or size. The phosphor concentrations of the first and second unit sub-phosphor patterns P11 and P12 may be the same. The pattern spacing distance of each of the unit sub-phosphor patterns P11 and P12 may be equal to each other and may be greater than the length or width of each sub-phosphor pattern P11 and P12. Here, the unit sub-phosphor patterns P11 and P12 may include a first unit sub-phosphor pattern P11 disposed on one side of the resin layer and a second unit-phosphor pattern P12 disposed on the other side. The first and second unit-phosphor patterns P11 and P12 are arranged at equal intervals, and at least a portion of the first and second unit-phosphor patterns may overlap each other in the short axis direction.

As shown in FIG. 10, the region of the sub-phosphor pattern P20 may be disposed within the distance L11 from the first surface 22 of the resin layer 210 to one end of the third unit-phosphor pattern P3. The distance L11 may be 50% or less of the length L0 of the resin layer 210, for example, in the range of 30% to 50%. The region of the sub-phosphor pattern P20 may arranged around the first and second unit-phosphor patterns P1 and P2 having a relatively narrow pattern width to compensate the wavelength conversion efficiency for the function of the main phosphor pattern P10 on the incident side region of the resin layer 210.

The light wavelength conversion layer 250 may provide uniform wavelength conversion efficiency in the entire region by the main phosphor pattern P10 and the sub-phosphor pattern P20, so that the light distribution intensity may be uniformly distributed in the range of 50% or more or 50% to 75%. Additionally, since the light converted by the light wavelength conversion layer 250 is emitted, rail lighting or line lighting of uniform intensity may be provided.

As shown in FIGS. 1, 2, and 4, the reflective member 300 may have a receiving groove 310 therein and may include a bottom portion 301 and a sidewall portion 305. The upper portion of the reflective member 300 is open, and the resin layer 210 in which the light wavelength conversion layer 250 is disposed may be received in the receiving groove 310. One side of the reflective member 300 is open, and the printed circuit board 101 is disposed on the one side of the reflective member 310, and the light emitting device 103 may face the incident-side first surface 22 of the resin layer 210. The material of the reflective member 300 includes reflective resin, and may include, for example, plastic resin. The light wavelength conversion layer 250 may be disposed between the reflective member 300 and the resin layer 210.

As shown in FIG. 6, it includes a colored optical layer 360 on the resin layer 210, and the colored optical layer 360 emits the second light whose wavelength is converted by the light wavelength conversion layer 250, and may block or absorb the first light emitted from the light emitting device 103 or light in the same wavelength range. Accordingly, the colored optical layer 360 may emit second light, such as red light. The colored optical layer 360 is made of a red material, may pass red light and restrict light with a wavelength shorter than red. The colored optical layer 360 may be coupled to the reflective member 300 or may be spaced apart. An optical member 350 is disposed between the colored optical layer 360 and the resin layer 210, and the optical member 350 may diffuse the incident first and second lights.

Figure 12:
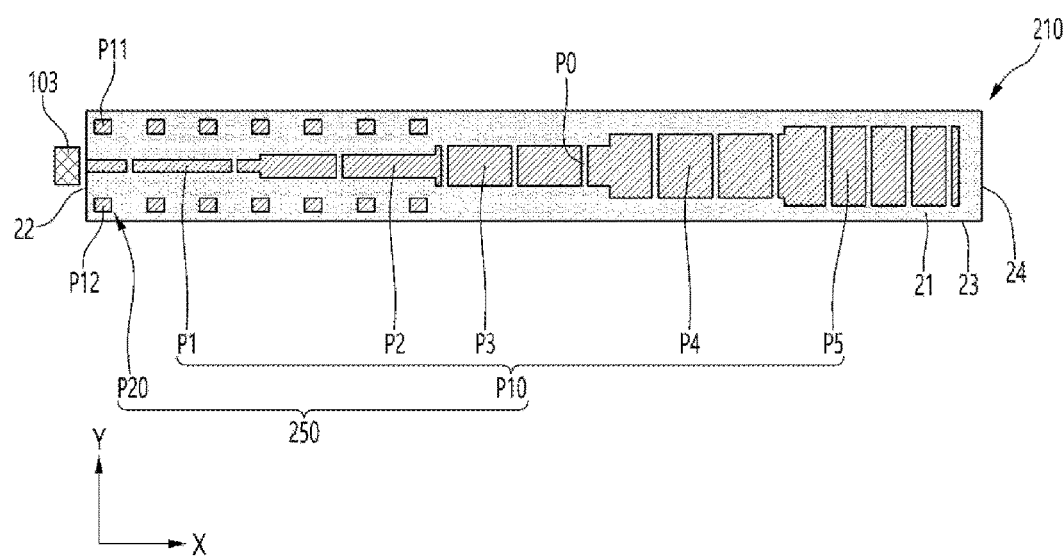
FIG. 12 is another example of the light wavelength conversion layer of FIG. 10.

As shown in FIG. 12, the main phosphor pattern P10 of the light wavelength conversion layer 250 may be discontinuously disposed by gap portions P0 along the long axis direction, and an interval between the gap portions P0 may become narrower as the distance from the first surface 22 of the resin layer 210 increases. The interval between the gap portions P0 may become wider as the distance from the second surface 22 of the resin layer 210 increases. The gap portions P0 are a region where the light wavelength conversion layer 250 is removed, and the bottom 21 may be exposed to the gap portions P0.

Figure 13:
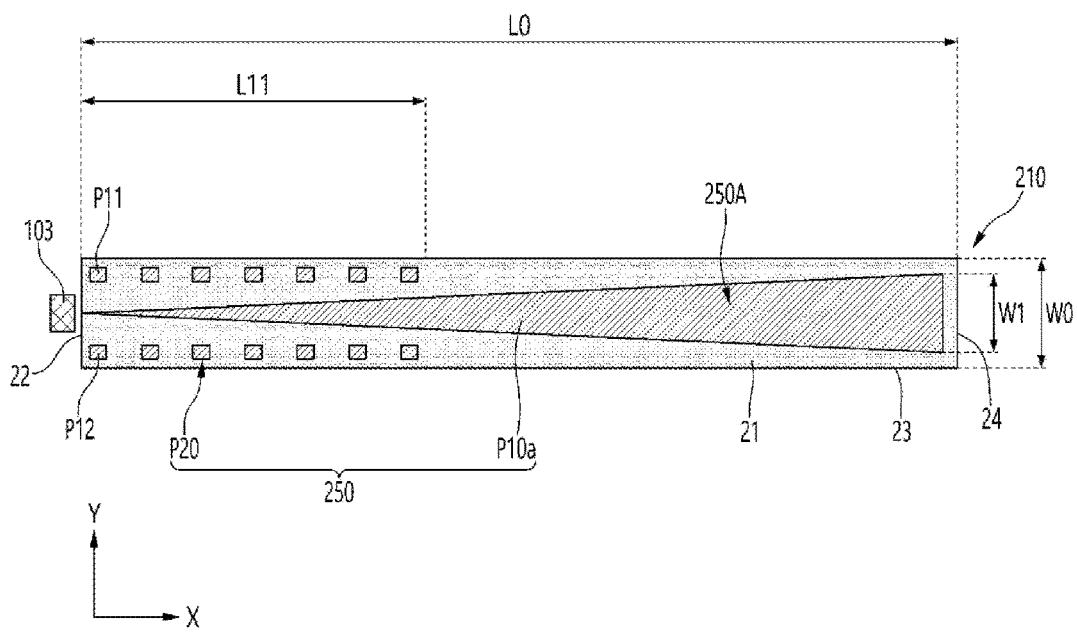
FIG. 13 is a first modified example of the light wavelength conversion layer disposed on the bottom of the resin layer of FIG. 10.
Figure 14:
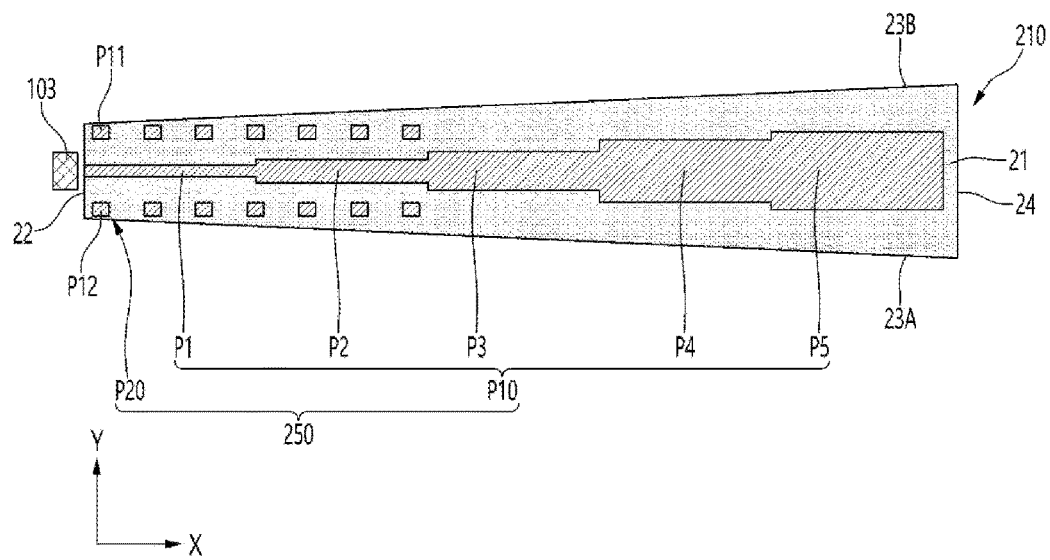
FIG. 14 is a second modified example of the resin layer and light wavelength conversion layer of FIG. 10.

As shown in FIG. 13, the main phosphor pattern P10a of the light wavelength conversion layer 250 may be formed continuously or with a gradually increasing width from the first surface 22 to the second surface 24. Here, the width of the unit-phosphor pattern P5A, which is relatively wide among the main phosphor patterns P10a, may be increased linearly or non-linearly. In the above, the resin layer 210 was described as an example in which the width of the first surface 22 and the width of the second surface 24 are the same, and another example is shown in FIG. 14. As shown in FIG. 14, the resin layer 210 may have a structure in which the first surface 22 has a small width and the second surface 24 has a wider width than that of the first surface 22. The width of the resin layer 210 may increase linearly or non-linearly as it approaches the second surface 24. That is, the interval between the first and second surfaces 23A and 23B of the resin layer 210 may increase linearly or non-linearly as the region approaches the second surface 24. Each of the first, second unit sub-phosphor patterns P11 and P12 of the sub-phosphor pattern P20 may be arranged on the same straight line or arranged in a diagonal shape at equal intervals from the first and second surfaces 23A and 23B. Accordingly, the interval in the second direction Y between the first, second unit sub-phosphor patterns P11 and P12 may be the same or may become wider as it approaches the second surface 22 of the resin layer 210.

Figure 15:
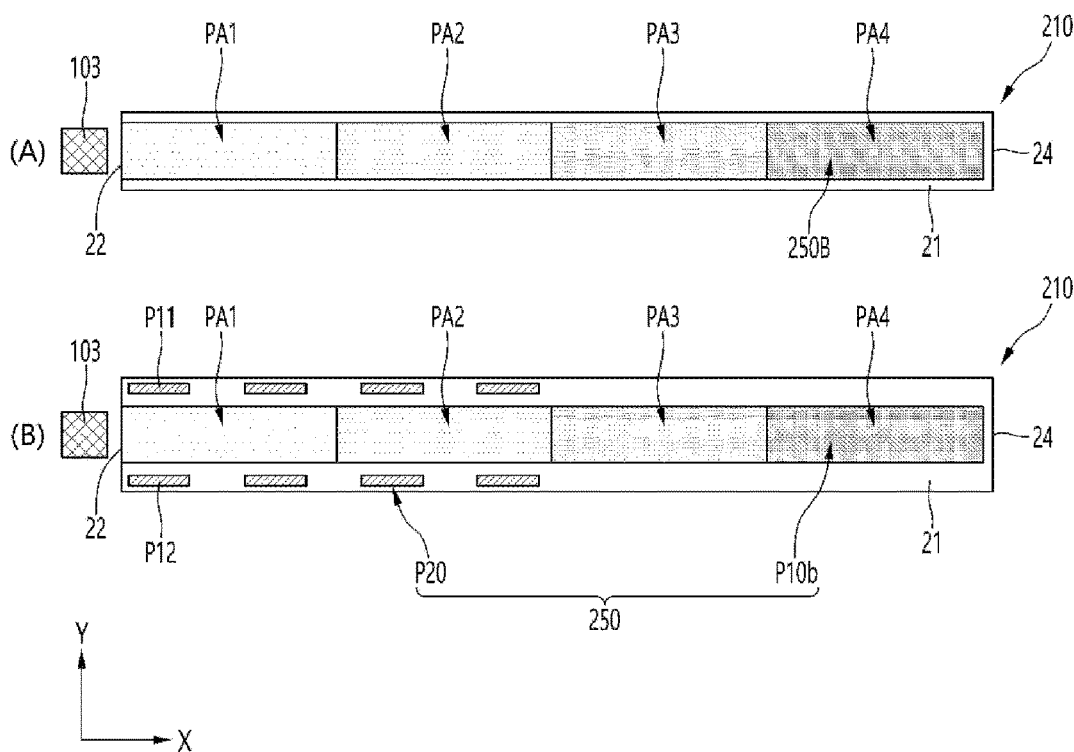
FIG. 15 (A) and (B) are examples of a third modification of the light wavelength conversion layer disposed on the bottom of the resin layer of FIG. 10.

As shown in of FIG. 15(A), the light wavelength conversion layer 250B may have different phosphor concentrations for the plurality of regions PA1, PA2, PA3, and PA4. The phosphor concentration may be lower in a region closer to the first surface 22 of the resin layer 210, and may be higher in a region further away. As another example, the phosphor concentration may gradually increase from the first surface 22 to the second surface 24 of the resin layer 210. In the light wavelength conversion layer 250B, the length of each of the plurality of regions PA1, PA2, PA3, and PA4 may be the same or may become larger as they are adjacent to the second surface 24. In the light wavelength conversion layer 250B, the widths of the plurality of regions PA1, PA2, PA3, and PA4 may be the same or may become larger as they are adjacent to the second surface 24.

In addition, the phosphor concentration, the plurality of regions PA1, PA2, PA3, and PA4 disclosed in the embodiment of the invention may provide a difference in the unit area of the wavelength conversion region in each region, the difference in size of the dot(s) pattern or line(s) pattern of the wavelength conversion region in each region, and a different intervals or gap portions between wavelength conversion regions. Accordingly, the areas or phosphor concentrations of the phosphor region may increase for each partial region, continuously or discontinuously, as it moves from the first surface 22 to the second surface 24 of the resin layer 210.

As shown in FIG. 15(B), the light wavelength conversion layer 250 may include a main phosphor pattern P10b having different phosphor concentrations for the plurality of regions PA1, PA2, PA3, and PA4. The phosphor concentration may be lower in a region closer to the first surface 22 of the resin layer 210, and may be higher in a region further away from the first surface 22. As another example, the phosphor concentration may gradually increase from the first surface 22 to the second surface 24 of the resin layer 210. The light wavelength conversion layer 250 may include sub-phosphor patterns P20 (P11 and P12) disposed on both sides of the first and second regions PA1 and PA2 among the plurality of regions PA1, PA2, PA3, and PA4. In the light wavelength conversion layer 250, the length of each of the plurality of regions PA1, PA2, PA3, and PA4 may be the same or may become larger as they are adjacent to the second surface 24. The widths of the plurality of regions PA1, PA2, PA3, and PA4 in the light wavelength conversion layer 250 may be the same or may become larger as they are adjacent to the second surface 24.

Figure 16:
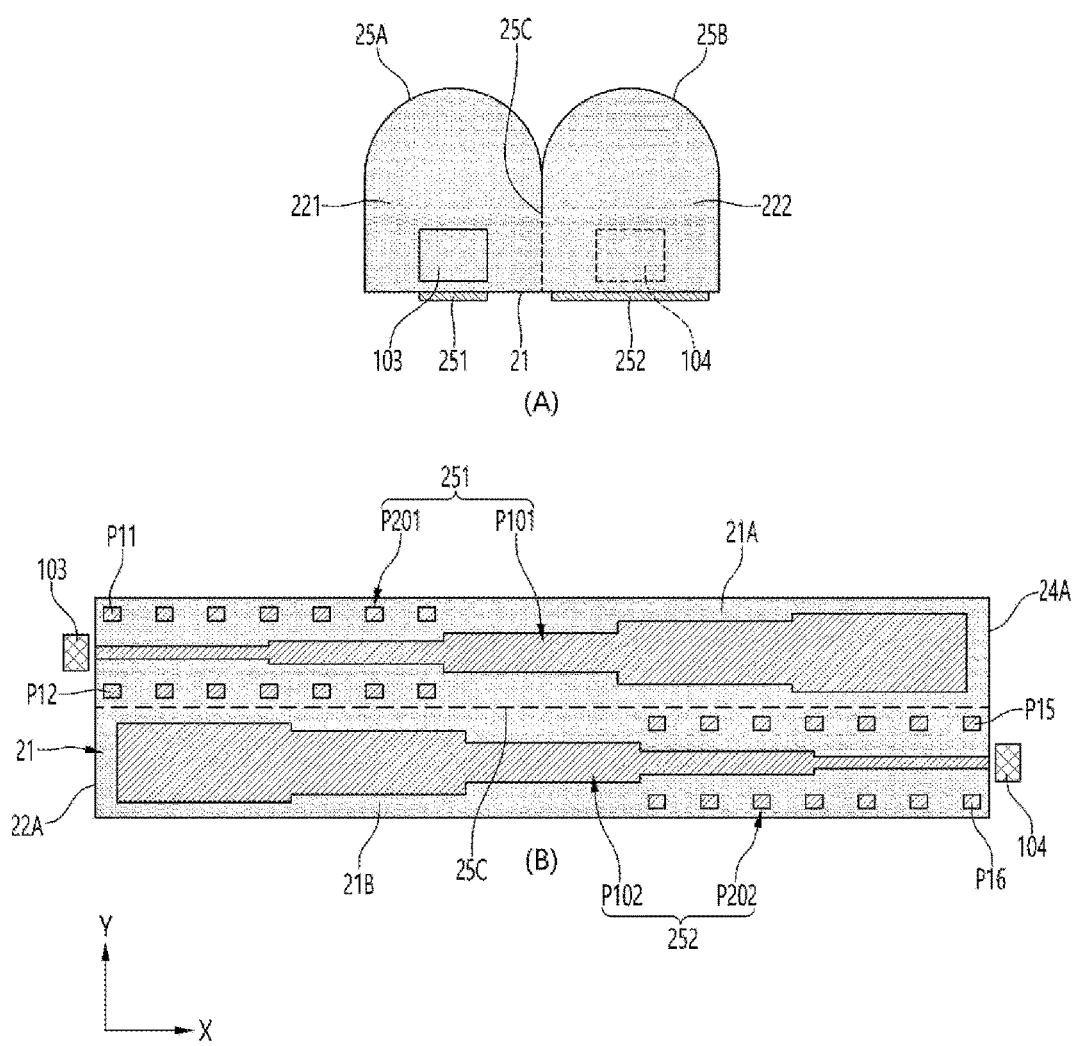
FIG. 16 (A) and (B) are another example of a lighting device according to an embodiment of the invention.

As shown in FIG. 16, a plurality of light wavelength conversion layers 251 and 252 disposed on the bottom of the resin layers 221 and 222 are arranged in the short axis direction, and each of the plurality of light wavelength conversion layers 251 and 252 may have a long length in the long axis direction. The first light wavelength conversion layer 251 is disposed in the first region 21A of the bottom 21 of one side surface of the resin layer 221, and may have the main and sub-phosphor patterns P101 and P201 and may be arranged as in the structure of FIG. 10. For the first light wavelength conversion layer 251, refer to the description of FIG. 10. The upper surface 25A of the resin layer 221 may be curved. The second light wavelength conversion layer 252 is disposed in the second region 21B of the bottom 21 of the resin layer 222, has main and sub-phosphor patterns P102 and P202, and may be arranged as the reverse structure of FIG. 10. The sub-phosphor pattern P202 may include first and second unit sub-phosphor patterns P15 and P16 arranged from the second surface 22, since the sub-phosphor pattern P202 is arranged in a symmetrical form of the first light wavelength conversion layer 251, the description of FIG. 10 will be referred to. The upper surface 25B of the resin layer 221 may be curved.

The upper surfaces 25A and 25B of the resin layers 221 and 222 are arranged in a double curved shape and may have a long length in the long axis direction. The boundary portion 25C between the resin layers 221 and 222 is a region that is adhered to each other or is integrated with each other, which block light interference between each other, or allow some light to travel to the opposite region. In the resin layers 221 and 222, the first light emitting device 103 may be disposed at one side of the first light wavelength conversion layer 251 on the first surface 22, and the second light emitting device 104 may be disposed at one side of the second light wavelength conversion layer 252 on the second surface 24.

The light wavelength conversion layers 251 and 252 disclosed above may have the same width, a width that increases linearly, or a width that increases non-linearly, or the gap portions (see P0 in FIG. 12) may be arranged at gradually narrower or gradually wider intervals. The intervals between the gap portions is not adjusted, and the width of each of the gap portions may gradually become wider toward the second surface 24.

Figure 17:
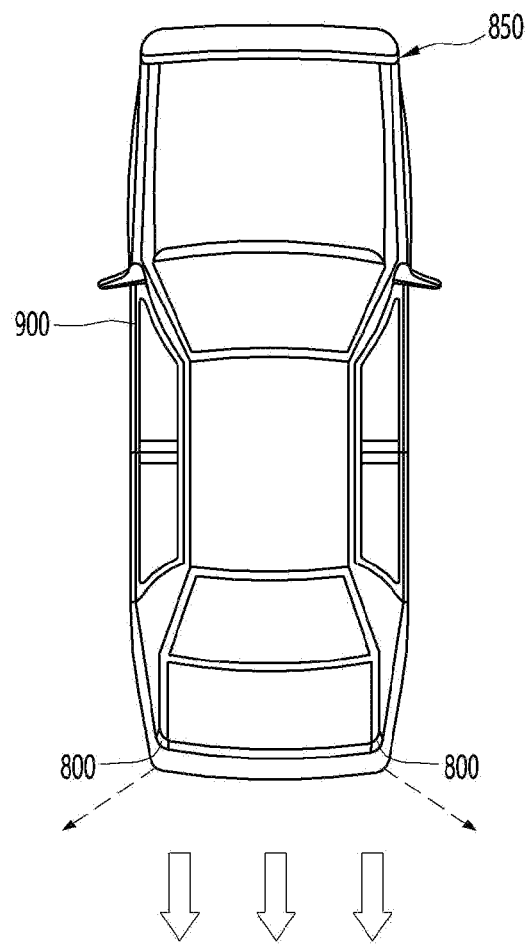
FIG. 17 is an example of a vehicle to which a lighting device according to an embodiment of the invention is applied.
Figure 18:
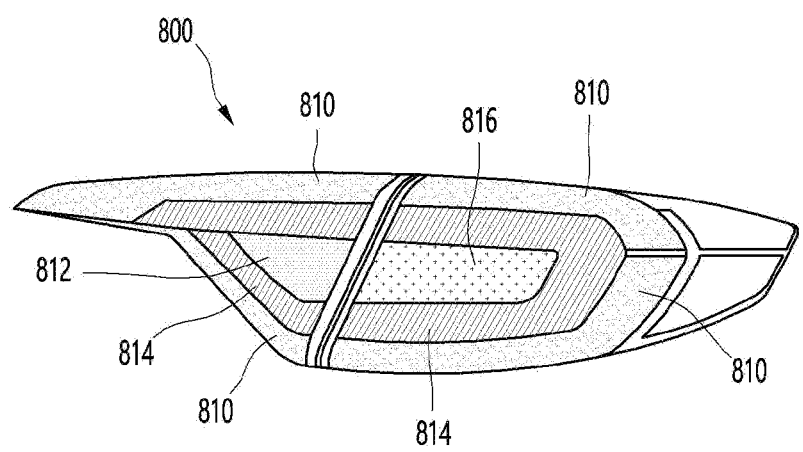
FIG. 18 is a diagram showing the tail lamp of the vehicle of FIG. 17.

FIG. 17 is a plan view of a vehicle equipped with a vehicle lamp to which a lighting device according to an embodiment of the invention is applied, and FIG. 18 is a diagram showing a tail light in the vehicle of FIG. 17.

Referring to FIGS. 17 and 18, the front lamp 850 in the moving object or vehicle 900 may include one or more lighting modules, and the operating timing of these lighting modules is individually controlled to function as a typical headlamp as well as, when the driver opens the vehicle door, additional functions such as welcome lights or celebration effects can be provided. The lamp may be applied to daytime running lights, high beams, low beams, fog lights, or turn signal lights. In the vehicle 900, the rear lights 800 may be arranged as a plurality of lamp units 810, 812, 814, and 816 supported by the housing 801. For example, the lamp units 810, 812, 814, and 816 include a first lamp unit 810 disposed on the outside, a second lamp unit 814 disposed around the inside of the first lamp unit 810, and third and fourth lamp units 814 and 816 respectively disposed inside of the second lamp unit 814. The first to fourth lamp units 810, 812, 814, and 816 may selectively apply the lighting device disclosed in the embodiment, and a red lens cover or a white lens cover is provided on the outside of the lighting device for the lighting characteristics of the lamp units 810, 812, 814, and 816. The lighting device disclosed in the embodiment applied to the lamp units 810, 812, 814, and 816 may emit surface light in a uniform distribution. The first and second lamp units 810 and 812 may be provided in at least one of a curved shape, a straight shape, an angled shape, an inclined shape, or a flat shape, or a mixed structure thereof. The first and second lamp units 810 and 812 may be arranged one or more in each taillight. The first lamp unit 810 may be provided as a tail light, the second lamp unit 812 may be provided as a brake light, and the third lamp unit 814 may be provided as a reverse light. The fourth lamp unit 816 may be provided as a turn signal lamp.

Features, structures, effects, etc. described in the embodiments above are included in at least one embodiment of the invention, and are not necessarily limited to only one embodiment. Furthermore, the features, structures, effects, etc. illustrated in each embodiment may be combined or modified with respect to other embodiments by those skilled in the art in the field to which the embodiments belong.

Therefore, contents related to these combinations and variations should be construed as being included in the scope of the invention.

The invention claimed is:

1. A lighting device comprising:
a reflective member;
a resin layer disposed on the reflective member;
a light emitting device disposed to correspond to a first side surface of the resin layer; and
a light wavelength conversion layer disposed on a bottom surface of the resin layer,
wherein the resin layer includes a second side surface opposite to the first side surface, and an upper surface opposite to the bottom surface,
wherein a length of the resin layer in a first direction is 10 times or more greater than a bottom width of the resin layer in a second direction perpendicular to the first direction,
wherein the first direction of the resin layer is a long axis direction of the resin layer and the second direction of the resin layer is a short axis direction of the resin layer,
wherein the light wavelength conversion layer includes a main phosphor pattern disposed in the long axis direction of the resin layer,
wherein the main phosphor pattern includes a first unit-phosphor pattern disposed in a first region and a second unit-phosphor pattern disposed in a second region,
wherein the first region is located closer to the light emitting device than the second region,
wherein a width of the first unit-phosphor pattern in the second direction is less than a width of the second unit-phosphor pattern in the second direction,
wherein the upper surface of the resin layer has a curved surface that is convex toward an upper surface of the reflective member with respect to the second direction,
wherein the main phosphor pattern includes a pattern having a length greater than the bottom width of the resin layer in the first direction, and
wherein the main phosphor pattern overlaps the convex upper surface in a direction perpendicular to the bottom surface of the resin layer.

2. The lighting device of claim 1, wherein the main phosphor pattern includes a third unit-phosphor pattern disposed on a third region adjacent to the second region,
wherein the second region is disposed between the first region and the third region,
wherein a width of the third unit-phosphor pattern is greater than the width of the first unit-phosphor pattern.

3. The lighting device of claim 2, wherein the first to third unit-phosphor patterns have the same length.

4. The lighting device of claim 1, wherein the light wavelength conversion layer is disposed in the first region and includes a sub-phosphor pattern disposed to be spaced apart from the first unit-phosphor pattern in the second direction.

5. The lighting device of claim 4, wherein the sub-phosphor pattern includes a plurality of unit sub-phosphor patterns spaced apart from each other in the first direction, and cross-sectional areas of the plurality of unit sub-phosphor patterns are the same.

6. The lighting device of claim 5, wherein the separation distances between the plurality of unit sub-phosphor patterns are the same.

7. The lighting device of claim 1, wherein a phosphor concentration of the first unit-phosphor pattern is the same as a phosphor concentration of the second unit-phosphor pattern.

8. The lighting device of claim 1, comprising a colored optical layer disposed on the resin layer and disposed on the reflective member,
wherein the colored optical layer emits light emitted from the light wavelength conversion layer, and limits an emission of light in the same wavelength range as a light emitted from the light emitting device.

9. A lighting device comprising:
a reflective member;
a resin layer disposed on the reflective member;
a light emitting device disposed to correspond to a first side surface of the resin layer;
a light wavelength conversion layer disposed on a bottom surface of the resin layer,
wherein the resin layer includes a second side surface opposite to the first side surface, and an upper surface opposite to the bottom surface,
wherein a length of the resin layer in a first direction is 10 times or more greater than a bottom width of the resin layer in a second direction perpendicular to the first direction,
wherein the first direction of the resin layer is a long axis direction of the resin layer and the second direction of the resin layer is a short axis direction of the resin layer,
wherein the light wavelength conversion layer includes a main phosphor pattern disposed in the long axis direction of the resin layer and a sub-phosphor pattern spaced apart from the main phosphor pattern in the second direction,
wherein the main phosphor pattern includes a first unit-phosphor pattern disposed in a first region, and
wherein the sub-phosphor pattern is disposed in the first region and includes a plurality of unit sub-phosphor patterns spaced apart from the first unit-phosphor pattern in the second direction,
wherein the upper surface of the resin layer has a curved surface that is convex toward an upper surface of the reflective member with respect to the second direction,
wherein the main phosphor pattern includes a pattern having a length greater than the bottom width of the resin layer in the first direction,
wherein the main phosphor pattern overlaps the convex upper surface in a direction perpendicular to the bottom surface of the resin layer, and
wherein a maximum width of the convex upper surface of the resin layer in the second direction is the same as the bottom width of the resin layer.

10. The lighting device of claim 9, comprising a printed circuit board on which is the light emitting device is disposed,
wherein the printed circuit board is disposed on one side of the reflective member, and
wherein the light wavelength conversion layer is disposed between the resin layer and the reflective member.

11. A lighting device comprising:
a resin layer;
a light emitting device disposed to correspond to a first side surface of the resin layer;
a light wavelength conversion layer disposed on a bottom surface of the resin layer; and
a colored optical layer disposed on an upper surface of the resin layer,
wherein the resin layer includes a second side surface opposite to the first side surface, and the upper surface opposite to the bottom surface, wherein a length of the resin layer in a first direction is 10 times or more greater than a bottom width of the resin layer in a second direction perpendicular to the first direction, wherein the first direction of the resin layer is a long axis direction of the resin layer and the second direction of the resin layer is a short axis direction of the resin layer, wherein the light wavelength conversion layer includes regions with different concentrations of phosphors, wherein the light wavelength conversion layer includes a main phosphor pattern disposed in the long axis direction of the resin layer and a plurality of sub-phosphor patterns disposed on both sides of the main phosphor pattern in the second direction, wherein the plurality of sub-phosphor patterns is disposed along both sides of the resin layer on the bottom surface of the resin layer, wherein the plurality of sub-phosphor patterns is disposed in at least one of regions of the light wavelength conversion layer adjacent to the light emitting device, and wherein the colored optical layer emits light that has passed through the phosphors and limits an emission of light in the same wavelength range as a light emitted from the light emitting device, wherein the upper surface of the resin layer has a curved surface that is convex toward an emitting direction of the resin layer with respect to the second direction, wherein the main phosphor pattern includes a pattern having a length greater than the bottom width of the resin layer in the first direction, and wherein the main phosphor pattern overlaps the convex upper surface in a direction perpendicular to the bottom surface of the resin layer.

12. The lighting device of claim 11, wherein the light wavelength conversion layer includes a first region where a phosphor of a first concentration is disposed, a second region where a phosphor of a second concentration is greater than the first concentration, and a third region where a phosphor of a third concentration is greater than the second concentration.

13. The lighting device of claim 12, wherein the light emitted from the light emitting device, converted to wavelength in the first to third regions, and passing through the colored optical layer are uniform.

14. The lighting device of claim 12, wherein the light emitting device emits blue light, wherein the light of the light emitting device that passes through the light wavelength conversion layer includes a wavelength range of 615 nm to 650 nm, wherein the colored optical layer is formed in red.

15. The lighting device of claim 11, wherein the light wavelength conversion layer is adhered to the bottom surface of the resin layer, and wherein a maximum width of the convex upper surface of the resin layer in the second direction is the same as the bottom width of the resin layer.

16. The lighting device of claim 11, comprising:

a reflective member including a receiving groove therein and a printed circuit board on which the light emitting device is mounted, wherein the bottom surface of the resin layer is flat, wherein the reflective member includes an open upper portion, a bottom portion under the resin layer, and sidewall portions on both sides of the resin layer, wherein the reflective member is open on one side, wherein the light emitting device faces the first surface of the resin layer at the one open side of the reflective member, wherein the resin layer is disposed in the receiving groove of the reflective member and wherein the light wavelength conversion layer disposed on the bottom surface of the resin layer is disposed on the bottom portion of the reflective member.

17. The lighting device of claim 16, wherein both side surfaces of the resin layer extend vertically between a lower end of the convex curved surface and the bottom surface, wherein the both side surfaces of the resin layer and the upper surface have a long length in the long axis direction.

18. The lighting device of claim 1, wherein the light wavelength conversion layer is adhered to the bottom surface of the resin layer, and wherein a maximum width of the convex upper surface of the resin layer in the second direction is the same as the bottom width of the resin layer.

19. The lighting device of claim 18, wherein the bottom surface of the resin layer is flat, wherein both side surfaces of the resin layer extend vertically between a lower end of the convex curved surface and the bottom surface.

20. The lighting device of claim 18, wherein the reflective member includes a receiving groove therein and a printed circuit board on which the light emitting device is mounted, wherein the reflective member includes an open upper portion, a bottom portion under the resin layer, and sidewall portions on both sides of the resin layer, wherein the reflective member is open on one side, wherein the light emitting device faces the first surface of the resin layer at the one open side of the reflective member, wherein the resin layer is disposed in the receiving groove of the reflective member, and wherein the light wavelength conversion layer disposed on the bottom surface of the resin layer is disposed on the bottom portion of the reflective member.

* * * * *